(12) United States Patent
Stochniol et al.

(10) Patent No.: US 6,210,557 B1
(45) Date of Patent: Apr. 3, 2001

(54) ELECTROCATALYTIC SELECTIVE OXIDATION OF HYDROCARBONS

(75) Inventors: Guido Stochniol; Mark Duda; Adolf Kuehnle, all of Marl (DE)

(73) Assignee: Creavis Gesellschaft für Technologie und Innovation mbH, Marl (DE)

( * ) Notice: Subject to any disclaimer, the term of this patent is extended or adjusted under 35 U.S.C. 154(b) by 0 days.

(21) Appl. No.: 09/395,214

(22) Filed: Sep. 14, 1999

(30) Foreign Application Priority Data

Sep. 14, 1998 (DE) .............................................. 198 41 872

(51) Int. Cl.⁷ ....................................................... C25B 3/00
(52) U.S. Cl. ................................................................. 205/413
(58) Field of Search ................................................ 205/413

(56) References Cited

U.S. PATENT DOCUMENTS

| | | | |
|---|---|---|---|
| 4,329,208 | 5/1982 | Vayenas et al. | 204/59 R |
| 4,661,422 | 4/1987 | Marianowski et al. | 429/13 |
| 4,802,958 | * 2/1989 | Mazanec et al. | 204/80 |
| 5,509,189 | * 4/1996 | Tuller et al. | 29/623.1 |

FOREIGN PATENT DOCUMENTS

| | | |
|---|---|---|
| 197 02 619 C1 | 4/1998 | (DE) . |
| 0 417 723 A2 | 3/1991 | (EP) . |
| 9-239956 | 9/1997 | (JP) . |

OTHER PUBLICATIONS

T. Tsunoda et al, "Propene oxidation over $MoO_3$ film deposited on an Au/YSZ/Ag system", Catalysis Today, vol. 25, pp. 371–376, 1995, No Month Available.

Y. Jiang, et al, "Methane to ethylene with 85 percent yield in a gas recycle electrocatalytic reactor–separator", Science, vol. 264, pp. 1563–1566, Jun. 10, 1994.

Constantinos G. Vayenas et al, "In situ electrochemically controlled promotion of complete and partial oxidation catalysts", 3$^{rd}$ World Congress on Oxidation Catalysis, pp. 76–93, No Month Available.

* cited by examiner

*Primary Examiner*—Edna Wong
(74) *Attorney, Agent, or Firm*—Oblon, Spivak, McClelland, Maier & Neustadt, P.C.

(57) ABSTRACT

A process for the electrochemical oxidation of organic compounds, wherein the anode material used is a mixed oxide of formula (I)

$$Mo_aBi_bX^1_cX^2_dX^3_eX^4_fX^5_gO_h \qquad (I)$$

where
$X^1$ is V, Nb, Cr, W, Ta, Ga, Ce, and/or La; $X^2$ is Li, La, K, Rb, Cs, Cu, Ag, Au, Pd and/or Pt; $X^3$ is Fe, Co, Ni and/or Zn; $X^4$ is Sn, Rb, Sb and/or Te; $X^5$ is Ti, Zr, Si and/or Al; and where a is 0–3; b is 0–3; c is 0–12.5; d is 0–5; e is 0–1.5; f is 0–1; and g is 0–25
with the proviso that $a+d \geq 0.15$.

14 Claims, 1 Drawing Sheet

ELECTROCATALYTIC SELECTIVE OXIDATION OF HYDROCARBONS

BACKGROUND OF THE INVENTION

1. Field of the Invention

The present invention relates to an electrochemical process for the selective preparation of partially oxidized organic compounds.

2. Discussion of the Background

The direct selective oxidation of organic compounds has hitherto been possible only in a few cases, since the partially oxidized products are usually more reactive than the starting materials used, which leads to complete oxidation to form carbon dioxide. In particular, the problem of the direct oxidation of alkanes has up to now not been able to be solved satisfactorily.

Only maleic anhydride can be produced by direct oxidation using n-butane as starting material. In the above process, the stabilization of the oxidation product by ring formation plays a decisive role.

Many attempts to carry out the partial direct oxidation of nonreactive organic compounds have concentrated on the development of new heterogeneous catalysts, but the yield of the partially oxidized product is frequently not industrially satisfactory.

In comparison, less attention has been paid to electrochemical partial oxidation. In this area, the main focus of development work was, in contrast, the utilization of total oxidation of suitable compounds for the generation of electric energy in fuel cells.

An example of the electrochemical oxidation of organic compounds is described in U.S. Pat. No. 4,329,208, namely the oxidation of ethene to give ethylene oxide. This oxidation is carried out at an anode consisting of silver or a silver alloy by means of a solid electrolyte system comprising zirconium oxides.

Another process for the electrochemical oxidation of organic compounds is disclosed in U.S. Pat. No. 4,661,422. Here, hydrocarbons are oxidized at a metal/metal oxide anode in a salt melt as electrolyte. The salt melt comprises carbonate, nitrate or sulfate salts while the cathode is made up of mixed oxides of metals of groups I B, II B, III A, V B, VI B, VII B and VIII of the Periodic Table.

In *Catalysis Today*, 25, 371 (1995), Takehira et al, studied the partial oxidation of propene in a construction similar to a fuel cell. As electrolyte, they used Y-stabilized $ZrO_2$. The anode material employed was Au coated with an Mo-Bi mixed oxide as catalysts and the cathode material was Ag. The reaction temperature was 475° C.

The yield of the oxidation product desired in each case is generally so low that none of these processes has industrial relevance. Here, too, the problem of the total oxidation of the organic substrate to carbon dioxide has not yet been solved. In addition, the electrolyte acts as an "oxygen pump", i.e. the oxygen required for the oxidation is reduced at the cathode and then migrates in ionic form through the electrolyte to the anode. The anode space contains only the substrate to be oxidized and possibly an inert gas. The feeding of oxygen into the anode space does not lead to an increase in the yield of the desired oxidation product.

Another disadvantage is that the reaction temperature is determined by the oxygen conductivity of the electrolyte. The electrolytes used have a sufficient conductivity only at temperatures which are significantly above the optimum temperatures for such oxidation reactions, which must partly explain the low selectivity of the processes examined. Particularly, processes which use salt melts as electrolyte are forced to have such high reaction temperatures (up to 750° C.) that decomposition of the product is virtually unavoidable. Processes of this type are unsuitable for preparing thermally unstable compounds (e.g., Michael systems). The discovery of the NEMCA effect (Non Faradaic Electrochemical Modification of Catalytic Activity) opened up the opportunity of developing more economical electrochemical processes. In "*Studies in Surface Science and Catalysis*", R. K. Grasselli, S. T. Oyama, A. M. Gaffney, J. E. Lyons (Editors), 110, 77 (1997) and *Science* 264, 1563 (1994), Vayenas et al described an electrochemical process based on a conductive, porous metal (oxide) film on a solid electrolyte such as Y-stabilized $ZrO_2$. Gastight separation of the anode and cathode spaces is no longer necessary here and the oxidizing agent can also be fed into the anode space. However, it was found that the main product of the oxidation, carbon dioxide, still results from the total oxidation of the substrate and the selectivity to a desired partially oxidized product is very low even at low conversions.

SUMMARY OF THE INVENTION

It is, therefore, an object of the present invention to develop an electrochemical process for the partial oxidation of organic compounds.

It has surprisingly been found that organic compounds can be electrochemically oxidized very selectively if the anode material comprises mixed oxides of the type $Mo_a Bi_b X^1_c X^2_d X^3_e X^4_f X^5_g O_h$.

DESCRIPTION OF THE PREFERRED EMBODIMENTS

Figure 1:
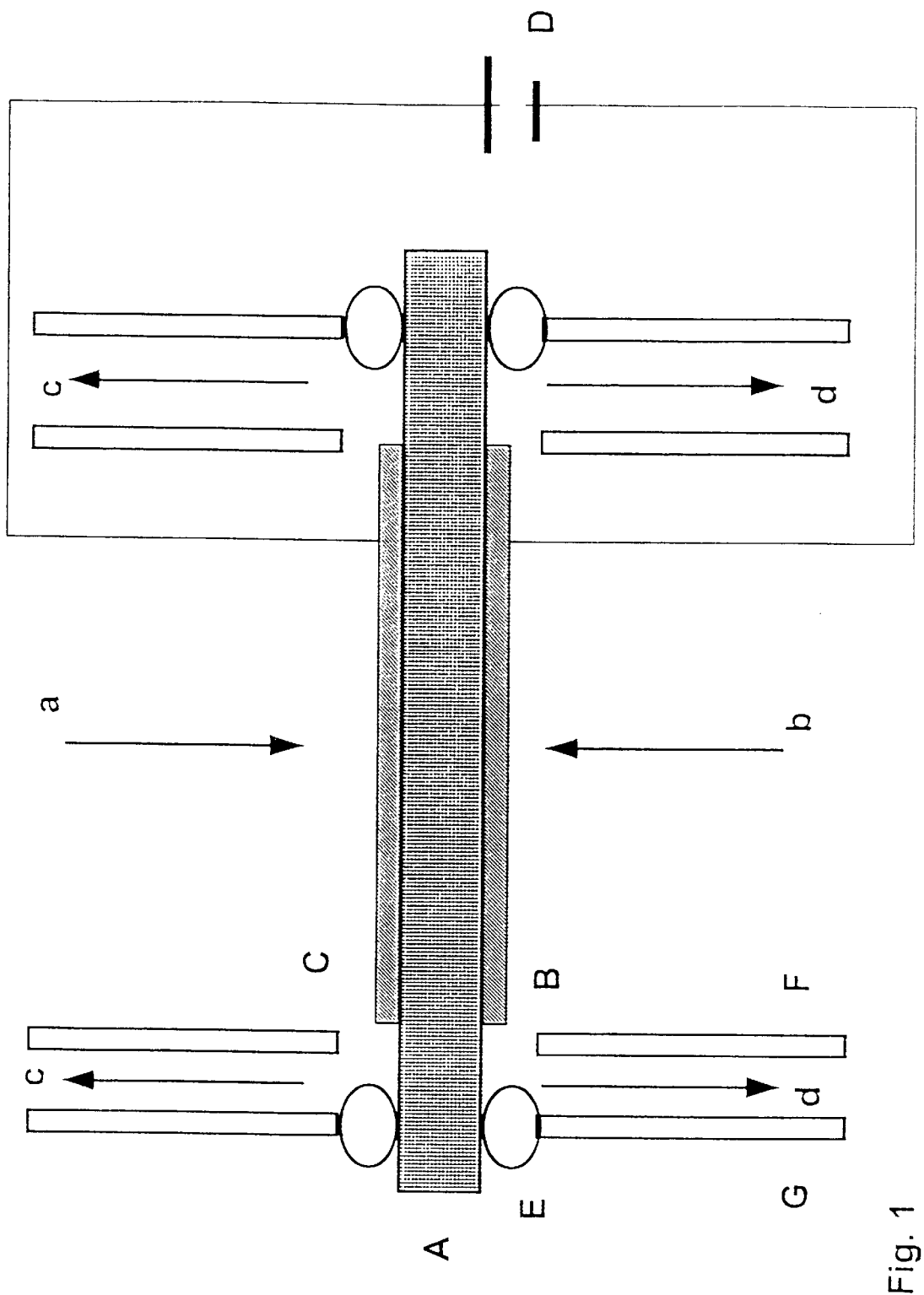
FIG. 1 shows an example of an apparatus for carrying out the process of the invention.

The present invention accordingly provides a process of the electrochemical oxidation of organic compounds, wherein the anode material used is a mixed oxide of the formula $$Mo_a Bi_b X^1_c X^2_d X^3_e X^4_f X^5_g O_h \qquad (I)$$

where $X^1$=V, Nb, Cr, W, Ta, Ga, Ce, and/or La;

$X^2$=Li, La, K, Rb, Cs, Cu, Ag, Au, Pd and/or Pt;

$X^3$=Fe, Co, Ni and/or Zn;

$X^4$=Sn, Pb, Sb and/or Te;

$X^5$=Ti, Zr, Si and/or Al, where a=0–3;

b=0–3;

c=0–12.5;

d=0–5;

e=0–1.5;

f=0–1; and, g=0–25, with the proviso that a+d≧0.15.

The number h of the oxygen atoms is determined by the valence and number of elements different from oxygen in the formula (I).

For the purposes of the present invention, the term "mixed oxides" includes multimetal oxide compositions as metal oxides existing side by side. In each case, phase precipitations are possible, depending on the stoichiometry and thermal treatment of the mixed oxides.

Mixed oxides of the abovementioned type are known from another industrial field and are used, for example, as heterogeneous catalysts for gas phase reactions. The preparation and use of these compounds is described, for example, in EP 0 417 723.

Mixed oxides of this type are used as heterogeneous catalysts in chemical reactions which do not involve electric current; their use as anode material in electrochemical processes is unknown.

The anode can consist completely or partly of the mixed oxides of the formula (I). In general, an existing electrode, e.g. of platinum, can also be provided with a surface comprising these mixed oxides.

It has been found useful in practice to apply first a film of the mixed oxides to the electrolyte by means of screen printing and to bond the film on by means of a heating step. An example of this technique may be found in JP 09 239 956.

The electrocatalytic layer advantageously has a rough surface having a BET (Brunauer-Emmett-Teller) surface area of from 5 to 20 m²/g.

The organic compound to be oxidized is, if desired in admixture with oxygen and/or an inert gas such as nitrogen, conveyed past such an anode. The starting materials can be fed in gaseous or liquid form, but gaseous feed has been found to be useful at the reaction temperatures according to the invention.

Many organic compounds such as aromatics, aliphatics, olefins or alicycles can be oxidized by means of the process of the invention. The present invention is particularly suitable for the oxidation of ethane, propane, ethene, ethyne, propene, benzene, butane, butadiene, butene, cyclohexane, octane, octene, cyclododecane or cyclododecene.

The electrolyte used in the process of the invention can be a solid which conducts oxygen ions, in particular a metal oxide.

In a particular embodiment of the present invention, a perovskite of the formula $$La_i X^6_k X^7_l Mg_m O_n \quad (II)$$

where
$X^6$=Ca, Sr, Ba;
$X^7$=Ga, Al;
i=0.3–0.9;
k=0.1–0.7;
with the proviso that i+k=0.9–1.0;
l=0.3–0.9;
m=0.1–0.7;
with the proviso that l+m=1–1.1;
is used as the solid which conducts oxygen ions.

The number n of oxygen atoms is determined by the valence and the number of elements different from oxygen in formula (II).

Other metal oxides which are suitable as the solid which conducts oxygen ions are, for example, $ZrO_2$ stabilized by CaO, $Sc_2O_3$, $Y_2O_3$, or $Yb_2O_3$ and also $CeO_2$ stabilized by $La_2O_3$, $Y_2O_3$, $Yb_2O_3$ or $Gd_2O_3$.

In a further embodiment of the present invention, pyrochlore compounds of the formula $$(Ln_o X^8_p)_2 (X^9_q X^{10}_r)_2 O_s \quad (III)$$

where
Ln=La, Ce, Pr, Nd, Pm, Sm, Eu, Gd, Tb, Dy, Ho, Er, Tm, Yb or Lu;
$X^8$=Mg, Ca or Sr;
$X^9$=Ti or Zr;
$X^{10}$=Fe, Al, Sc, Ga or Y;
o=0.4–1;
p=0–0.6;
q=0.4–1;
r=0–0.6;
can be used as the solid which conducts oxygen ions.

The number s of oxygen atoms is determined by the valence and number of elements different from oxygen in formula (III).

These compounds can be prepared, for example, by means of drip pyrolysis (P. Gordes et al., *Den. J. Mater. Sci.*, 30 (4), 1053–8 (1995)) or decomposition methods (e.g. N. Dhas et al., *India J. Mater. Chem.*, 3 (12), 1289–1294 (1993), or D. Fumo et al., *Port. Mater. Res. Bull.*, 32 (10), 1459–1470 (1997)).

The cathode used in the process of the invention can be a metal, preferably silver or platinum.

One or more metal oxides or a mixed metal oxide can also be used as cathode.

Furthermore, perovskites of the formula $$La_t X^{11}_u X^{12}_v X^{13}_w X^{14}_x O_{3\pm y} \quad (IV)$$

where
$X^{11}$=Ce, Pr, Nd, Pm, Sm, Eu, Gd, Tb, Dy, Ho, Er, Tm, Yb or Lu;
$X^{12}$=Ca, Sr, Ba;
$X^{13}$=Mn, Fe;
$X^{14}$=Cr, Co, Ni, Al;
t=0.5–1;
u=0–0.5;
v=0.1–0.4;
with the proviso that t+u+v≦1;
w=0.6–1.1;
x=0–0.7;
with the proviso that w+x≧1;
can be used as cathode.

The provisos regarding the sums of t, u and v (≦1) and also w and x (≧1) represent particular embodiments of the present invention. In other embodiments, t+u+v can be from 0.85 to 1. Furthermore, w+x can be from 1 to 1.1.

The number of oxygen atoms (3±y) is defined by the valence and number of elements different from oxygen.

German Patent 197 02 619 C1 describes the preparation of nonstoichiometric perovskites of the formula $La_w M_x Mn_y Co_zO_3$ as cathode material for high-temperature fuel cells. However, fuel cells have been developed for a different industrial process, namely the production of electric energy from total oxidation of a substrate.

The electrochemical oxidation of organic compounds by the process of the invention is carried out at elevated temperatures, preferably from 200 to 750° C., particularly preferably from 250 to 550° C.

The application of superatmospheric pressures is likewise possible; pressures of from 1 to 100 bar, preferably from 1 to 10 bar, can be applied.

In the process of the invention, oxygen is converted into an ionic form at the cathode and conducted through the electrolyte to the anode and at the anode it is activated so that a reaction occurs with the organic compound conveyed past. The oxygen can also be fed in through a porous solid electrolyte which is not impermeable to gas. The gas stream in the anode space can further comprise an inert gas, in addition to the organic compound to be oxidized and oxygen.

An example of an apparatus for carrying out the process of the invention is shown in FIG. 1.

The cathode B and the Anode C are applied to the electrolyte A which conducts oxygen ions. Here, care must be taken to ensure that an electrical connection is achieved between the materials e.g. by heat treatment. The two electrodes are supplied with electric power by means of the voltage source D. The gas streams are passed to or from the electrodes via an external gas duct G and an internal gas duct F, the cell being selected from the surroundings by means of seals E of the external gas ducts G.

Starting material and oxygen are conveyed as gas stream a) to the anode C and the resulting product gas c) is removed either by the pressure of the gas stream a) or by means of an appropriate reduced pressure. Gas stream b) on the cathode side can consist of air, oxygen or another oxygen-containing gas mixture and is, depleted in oxygen, removed via the gas streams d).

The three-dimensional arrangement of anode, cathode and electrolyte is not restricted to flat plates or continuous layers. It is also possible to use tube reactor for the process of the invention. Here, anode and cathode materials are either applied to a tube made of the electrolyte or a support tube made of an inert material (for example $Al_2O_3$) is provided with appropriate layers. The necessary power leads are adapted appropriately.

Furthermore, anode or cathode layer can be configured as a woven fabric or a structured surface layer with regular depressions or elevations.

Having generally described this invention, a further understanding can be obtained by reference to certain specific examples which are provided herein for purposes of illustration only and are not intended to be limiting unless otherwise specified.

The following Examples are also recited in the priority document, German patent application 19841872.8 filed Sep. 14, 1998, which is incorporated herein by reference in its entirety.

EXAMPLES

1. Catalytic oxidation of propene (Comparative example)

A porous catalytic film having a BET surface area of 16 $m^2/g$ was applied by screen printing and subsequent heat treatment to an electrolyte film of $La_{0.8}Sr_{0.2}Ga_{0.85}Mg_{0.15}O_2$. Pt was vapor deposited as counter electrode. The reaction temperature was 400° C. A mixture of 5% of propene, 5% of oxygen and 90% of nitrogen was passed at 2 l/h over the anode. Air was passed over the cathode at the same rate. The results are summarized on Table I below:

TABLE I

| Anode material (catalytic film) | Acrolein formation (mmol/h*g) |
|---|---|
| $MoO_3$ | 0.05 |
| $Mo_3Bi_{1.25}FeCo_2Ca_{0.025}K_{0.025}O_x$ | 0.25 |
| $Mo_3Bi_{0.25}Ni_{2.07}Fe_{0.49}Si_{2.5}K_{0.0125}Na_{0.0375}O_x$ | 0.45 |

2. Electrocatalytic oxidation of propene under Faradaic conditions

A porous catalytic film having a BET surface area of 16 $m^2/g$ was applied by screen printing and subsequent heat treatment to an electrolyte film of $La_{0.8}Sr_{0.2}Ga_{0.85}Mg_{0.15}O_2$. Pt was vapor deposited as counterelectrode. The reaction temperature is 400° C. A mixture of 5% of propene and 95% of nitrogen was passed at 2 l/h over the anode. Air was passed over the cathode at the same rate. The applied voltage for controlling the oxygen ion flux was 1 V. The results are summarized on Table II below:

TABLE II

| Anode material (catalytic film) | Acrolein formation (mmol/h*g) |
|---|---|
| $MoO_3$ | 0.75 |
| $Mo_3Bi_{1.25}FeCo_2Ca_{0.025}K_{0.025}O_x$ | 0.45 |
| $Mo_3Bi_{0.25}Ni_{2.07}Fe_{0.49}Si_{2.5}K_{0.0125}Na_{0.0375}O_x$ | 0.85 |

3. Electrocatalytic oxidation of propene using oxygen in the starting material stream A porous catalytic film having a BET surface area of 16 $m^2/g$ was applied by screen printing and subsequent heat treatment to an electrolyte film of $La_{0.8}Sr_{0.2}Ga_{0.85}Mg_{0.15}O_2$. Pt was vapor deposited as counterelectrode. The reaction temperature was 400° C. A mixture of 5% of propene, 5% of oxygen and 90% of nitrogen was passed at 2 l/h over the anode. Air was passed over the cathode at the same rate. The applied voltage for controlling the oxygen ion flux was 0–3 V. Under these conditions, the electrochemical reactor operates under Faradaic conditions. The results are summarized on Table III below:

TABLE III

| Anode material (catalytic film) | Acrolein formation (mmol/h*g) |
|---|---|
| $MoO_3$ | 2.5 |
| $Mo_3Bi_{1.25}FeCo_2Ca_{0.025}K_{0.025}O_x$ | 1.1 |
| $Mo_3Bi_{0.25}Ni_{2.07}Fe_{0.49}Si_{2.5}K_{0.0125}Na_{0.0375}O_x$ | 3.2 |

Obviously, numerous modifications and variations of the present invention are possible in light of the above teachings. It is, therefore, to be understood that within the scope of the appended claims, the invention may be practiced otherwise than as specifically described herein.

What is claimed is:

1. A process for the electrochemical oxidation of an organic compound, comprising passing a mixture containing the organic compound and oxygen over an anode and oxidizing said compound in the presence of an electrolyte, the anode material and a cathode, wherein said anode material comprises a mixed oxide of the formula (I)

$$Mo_aBi_bX^1_cX^2_dX^3_eX^4_fX^5_gO_h \qquad (I)$$

where
X$^1$ is V, Nb, Cr, W, Ta, Ga, Ce and/or La;
X$^2$ is Li, La, K, Rb, Cs, Cu, Ag, Au, Pd and/or Pt;
X$^3$ is Fe, Co, Ni and/or Zn;
X$^4$ is Sn, Pb, Sb and/or Te;
X$^5$ is Ti, Zr, Si and/or Al, where
a is 0–3;
b is 0–3;
c is 0–12.5;
d is 0–5;
e is 0–1.5;
f is 0–1;
g is 0–25; and
h is determined by the valence and number of elements different from oxygen in formula (I);
with the proviso that a+d≧0.15.

2. The process of claim 1, wherein said electrolyte is a solid which conducts oxygen ions.

3. The process of claim 2, wherein said solid which conducts oxygen ions comprises a metal oxide.

4. The process of claim 3, wherein said solid which conducts oxygen ions is a perovskite of the formula (II)

$$La_iX^6_kX^7_lMg_mO_n \qquad (II)$$

where
- $X^6$ is Ca, Sr, Ba;
- $X^7$ is Ga, Al;
- i is 0.3–0.9;
- k is 0.1–0.7;
- with the proviso that i+k=0.9–1.0;
- l is 0.3–0.9;
- m is 0.1–0.7; and,
- n is determined by the valence and number of elements different from oxygen in formula (II);
- with the proviso that l+m=1–1.1.

5. The process of claim 2, wherein said solid which conducts oxygen ions is $ZrO_2$ or $CeO_2$; and wherein said $ZrO_2$ is stabilized by CaO, $Sc_2O_3$, $Y_2O_3$, or $Yb_2O_3$, and said $CeO_2$ is stabilized by $La_2O_3$, $Y_2O_3$ $Yb_2O_3$ or $Gd_2O_3$.

6. The process of claim 2, wherein said solid which conducts oxygen ions is a pyrochlore compound of the formula (III)

$$(Ln_oX^8_p)_2(X^9_qX^{10}_r)_2O_s \qquad (III)$$

where
- Ln is La, Ce, Pr, Nd, Pm, Sm, Eu, Gd, Tb, Dy, Ho, Er, Tm, Yb or Lu;
- $X^8$ is Mg, Ca or Sr;
- $X^9$ is Ti or Zr;
- $X^{10}$ is Fe, Al, Sc, Ga or Y;
- o is 0.4–1;
- p is 0–0.6;
- q is 0.4–1;
- r is 0–0.6; and
- s is determined by the valence and number of elements different from oxygen in formula (III).

7. The process of claim 1, wherein said cathode is a metal.

8. The process of claim 7, wherein said cathode is silver or platinum.

9. The process of claims 1, wherein said cathode comprises one or more metal oxides or a mixed metal oxide.

10. The process of claim 9, wherein said cathode is a perovskite of the formula $$La_tX^{11}_uX^{12}_vX^{13}_wX^{14}_xO_{3\pm y} \qquad (IV)$$

where
- $X^{11}$ is Ce, Pr, Nd, Pm, Sm, Eu, Gd, Tb, Dy, Ho, Er, Tm, Yb or Lu;
- $X^{12}$ is Ca, Sr, Ba;
- $X^{13}$ is Mn, Fe;
- $X^{14}$ is Cr, Co, Ni, Al;
- t is 0.5–1;
- u is 0–0.5;
- v is 0.1–0.4;
- with the proviso that t+u+v≦1;
- w is 0.6–1.1;
- x is 0–0.7; and
- 3±y is determined by the valence and number of elements different from oxygen in formula (IV);
- with the proviso that w+x≧1.

11. The process of claim 1, wherein said electrochemical oxidation is carried out at temperatures of from 200 to 750° C.

12. The process of claim 1, wherein said electrochemical oxidation is carried out at temperatures of from 250 to 500° C.

13. The process of claim 1, wherein said electrochemical oxidation is carried out at pressures of from 1 to 100 bar.

14. The process of claim 1, wherein said electrochemical oxidation is carried out at pressures of from 1 to 10 bar.

* * * * *